(12) United States Patent
Yamaguchi

(10) Patent No.: US 11,595,142 B2
(45) Date of Patent: Feb. 28, 2023

(54) RECEIVING APPARATUS, CORRECTION METHOD AND NON-TRANSITORY STORAGE MEDIUM

(71) Applicant: JVCKENWOOD Corporation, Yokohama (JP)

(72) Inventor: Tomohiro Yamaguchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/189,308

(22) Filed: Mar. 2, 2021

(65) Prior Publication Data

US 2021/0297173 A1 Sep. 23, 2021

(30) Foreign Application Priority Data

Mar. 19, 2020 (JP) .............................. JP2020-049811

(51) Int. Cl.
| | |
|---|---|
| *H04J 3/06* | (2006.01) |
| *H04W 56/00* | (2009.01) |
| *H04W 72/04* | (2009.01) |
| *H04W 72/0446* | (2023.01) |
| *H04B 7/08* | (2006.01) |
| *H04B 7/06* | (2006.01) |

(52) U.S. Cl.
CPC ........... *H04J 3/0652* (2013.01); *H04W 56/00* (2013.01); *H04W 72/0446* (2013.01); *H04B 7/0602* (2013.01); *H04B 7/0805* (2013.01)

(58) Field of Classification Search
CPC .. H04B 7/0602; H04B 7/0693; H04B 7/0805; H04J 3/0652; H04L 7/04; H04W 56/00; H04W 72/0446
See application file for complete search history.

(56) References Cited

U.S. PATENT DOCUMENTS

| | | | | |
|---|---|---|---|---|
| 5,790,941 | A | * 8/1998 | Peponides ......... | H04W 52/0245 455/574 |
| 6,587,526 | B1 | * 7/2003 | Li ............................ | H04L 1/04 375/357 |

(Continued)

FOREIGN PATENT DOCUMENTS

JP 08-307304 11/1996

*Primary Examiner* — Alpus Hsu
(74) *Attorney, Agent, or Firm* — Amin, Turocy & Watson, LLP

(57) ABSTRACT

A reception apparatus of a time division multiple access (TDMA) system for performing intermittent reception by a reception period of a time slot and a non-reception period of a predetermined number of time slots which follow the reception period and in which reception is suspended includes a symbol clock controller configured to perform symbol synchronization at a timing at which a synchronous word included in the reception period after the non-reception period, and correct a symbol clock frequency of a symbol clock based on a number of time slots and a symbol count value during a previous reception period and the non-reception period following the previous reception period; and a reception period controller configured to correct, after detection of the synchronous word, a reception termination timing of the reception period in which the synchronous word is detected based on the symbol clock with the corrected symbol clock frequency.

6 Claims, 2 Drawing Sheets

(56) References Cited

U.S. PATENT DOCUMENTS

| | | | |
|---|---|---|---|
| 6,618,459 B1* | 9/2003 | Tada | H04L 7/0331 |
| | | | 375/376 |
| 6,714,613 B2* | 3/2004 | Schenk | H04Q 11/0442 |
| | | | 375/365 |
| 7,035,364 B2* | 4/2006 | Talwalkar | H04L 27/0014 |
| | | | 375/365 |
| 7,480,359 B2* | 1/2009 | Takamatsu | H04L 7/0054 |
| | | | 375/355 |
| 7,620,072 B2* | 11/2009 | Kihara | H04L 7/005 |
| | | | 370/480 |
| 9,160,588 B2* | 10/2015 | Shibata | H04L 27/142 |

* cited by examiner

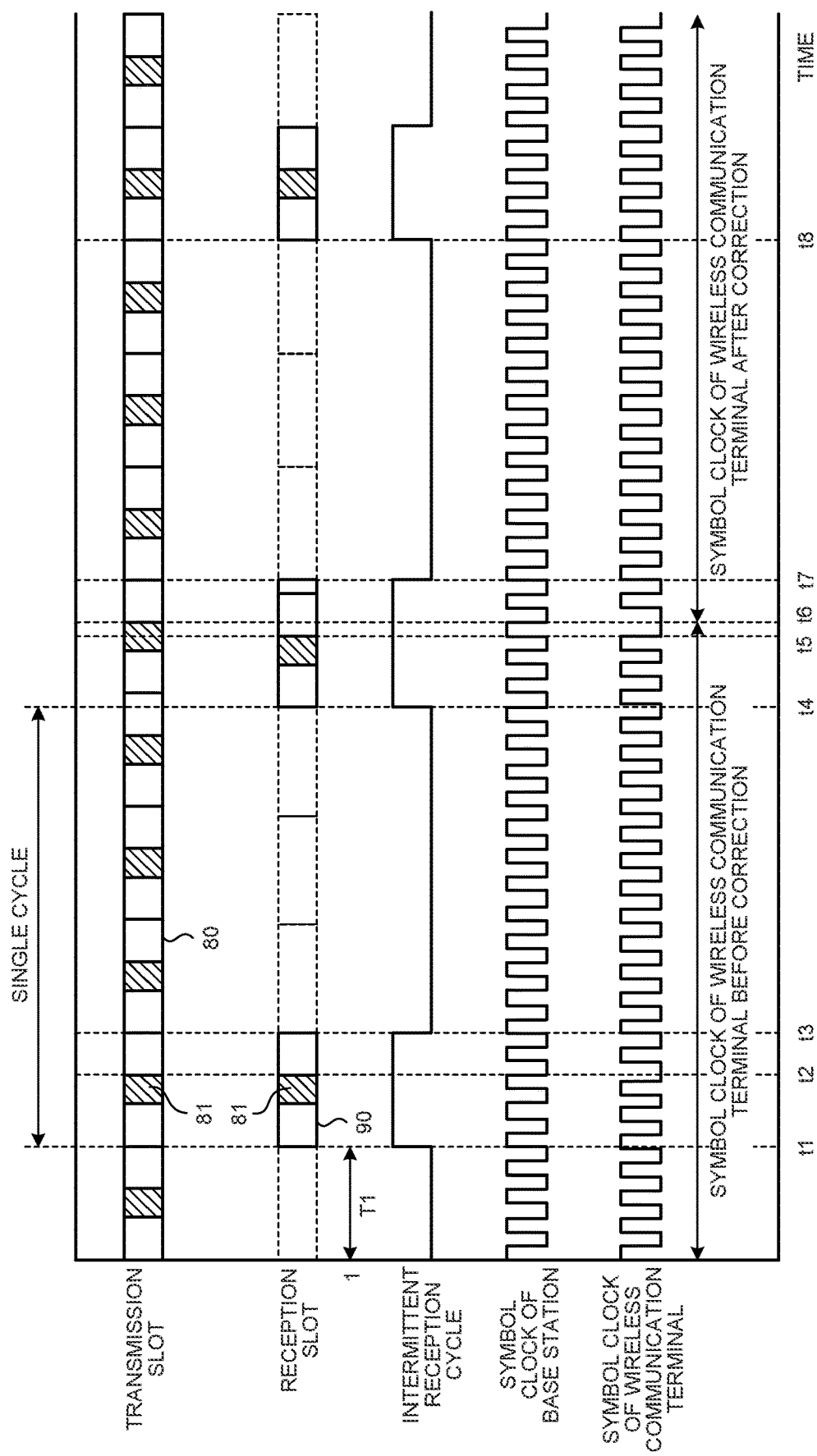

RECEIVING APPARATUS, CORRECTION METHOD AND NON-TRANSITORY STORAGE MEDIUM

CROSS-REFERENCE TO RELATED APPLICATION

This application claims priority from Japanese Application No. 2020-049811, filed on Mar. 19, 2020, the contents of which are incorporated by reference herein in its entirety.

FIELD

The present application relates to a receiving apparatus and a correction method.

BACKGROUND

In a wireless communication terminal (hereinafter, also referred to as a mobile station) that performs intermittent reception, a technique of synchronizing a symbol clock of a mobile station with a symbol clock of a base station has been known.

For example, Japanese Laid-open Patent Publication No. 08-307304 discloses a technique of a mobile communication terminal in which power consumption is reduced to a low level in a standby mode and reception performance is improved.

In the technique described in Japanese Laid-open Patent Publication No. 08-307304, a length of a period for detecting a unique word in a next slot is set in accordance with deviation of a timing to detect the unique word. However, since a length of a reception period in a slot in which synchronization deviation is detected and corrected is inappropriate, it may be difficult to demodulate data of the slot in which the synchronization deviation is detected.

SUMMARY

A receiving apparatus and a correction method are disclosed.

According to one aspect, there is provided a reception apparatus of a time division multiple access (TDMA) system for performing intermittent reception by a reception period of a time slot and a non-reception period of a predetermined number of time slots which follow the reception period and in which reception is suspended, the reception apparatus comprising: a symbol clock controller configured to perform symbol synchronization at a timing at which a synchronous word included in the reception period of the time slot after the non-reception period, and correct a symbol clock frequency of a symbol clock based on a number of time slots and a symbol count value that is a number of counted symbols during a previous reception period and the non-reception period which follow the previous reception period; and a reception period controller configured to correct, after detection of the synchronous word, a reception termination timing of the reception period of the time slot in which the synchronous word is detected based on the symbol clock with the corrected symbol clock frequency.

According to one aspect, there is provided a correction method implemented by a reception apparatus of a time division multiple access (TDMA) system for performing intermittent reception by a reception period of a time slot and a non-reception period of a predetermined number of time slots which follow the reception period and in which reception is suspended, the correction method comprising: performing symbol synchronization at a timing at which a synchronous word included in the reception period of the time slot after the non-eception period, correcting a symbol clock frequency of a symbol clock based on a number of time slots and a symbol count value that is a number of counted symbols during a previous reception period and the non-reception period which follow the previous reception period; and correcting, after detection of the synchronous word, a reception termination timing of the reception period of the time slot in which the synchronous word is detected based on the symbol clock with the corrected symbol clock frequency.

According to one aspect, there is provided a non-transitory storage medium that stores a program that causes a computer to execute a correction method implemented by a reception apparatus of a time division multiple access (TDMA) system for performing intermittent reception by a reception period of a time slot and a non-reception period of a predetermined number of time slots which follow the reception period and in which reception is suspended, the correction method comprising: performing symbol synchronization at a timing at which a synchronous word included in the reception period of the time slot after the non-reception period, correcting a symbol clock frequency of a symbol clock based on a number of time slots and a symbol count value that is a number of counted symbols during a previous reception period and the non-reception period which follow the previous reception period; and correcting, after detection of the synchronous word, a reception termination timing of the reception period of the time slot in which the synchronous word is detected based on the symbol clock with the corrected symbol clock frequency.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 2 is a timing diagram for explaining a method for correcting a symbol clock frequency.

DETAILED DESCRIPTION OF THE PREFERRED EMBODIMENTS

Figure 1:
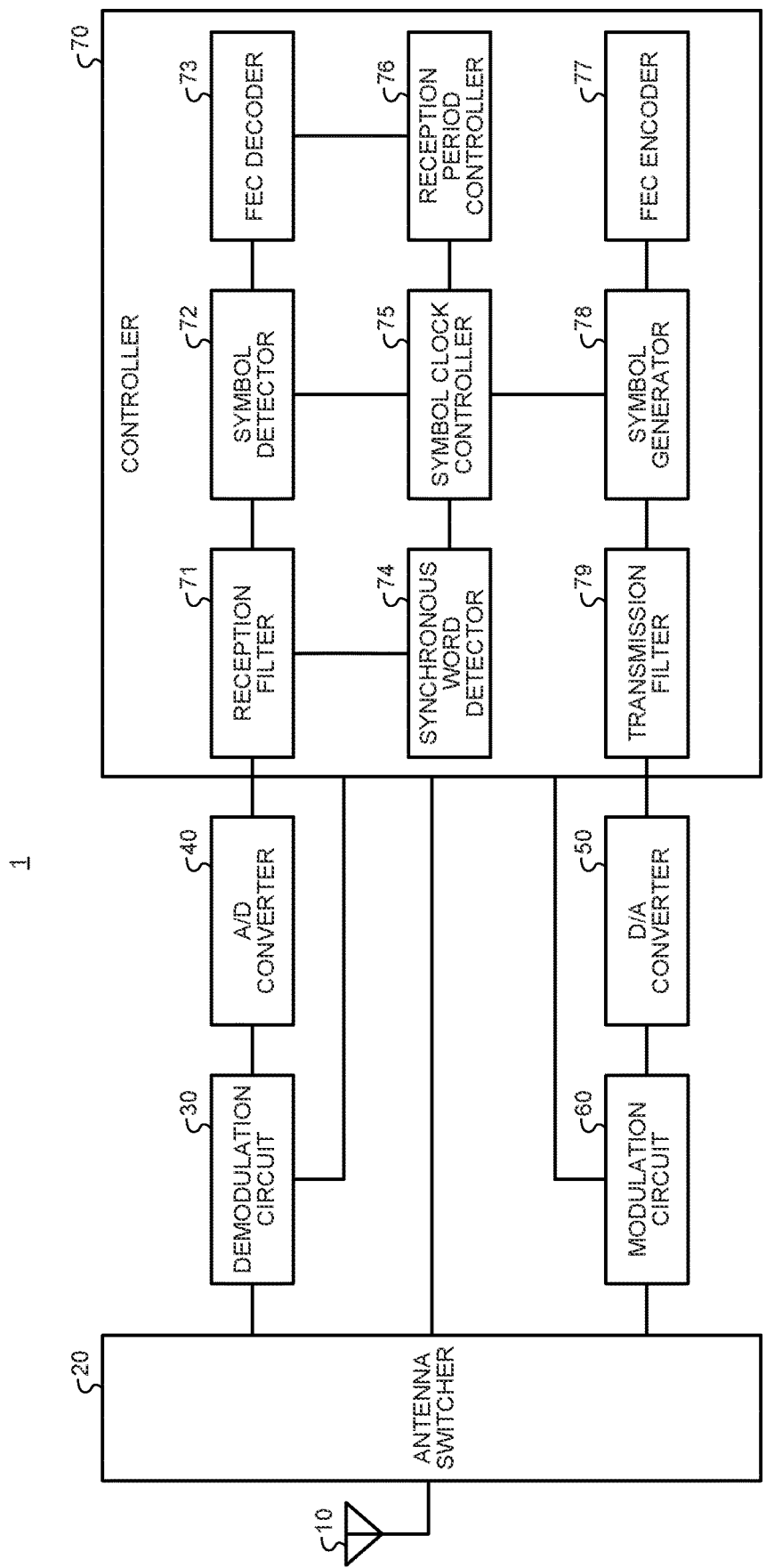
FIG. 1 is a block diagram illustrating an example of a configuration of a wireless communication terminal according to one embodiment.

Embodiments of the present application will be described in detail below with reference to the accompanying drawings. The present application is not limited by the embodiments below. Further, if a plurality of embodiments are present, the present application includes a configuration that is obtained by a combination of some embodiments. Furthermore, in the embodiments below, the same components are denoted by the same reference symbols, and repeated explanation will be omitted.

Wireless Communication Terminal

A configuration of a wireless communication terminal according to one embodiment will be described with reference to FIG. 1. FIG. 1 is a block diagram illustrating an example of a configuration of the wireless communication terminal according to the embodiment.

As illustrated in FIG. 1, a wireless communication terminal 1 includes an antenna 10, an antenna switcher 20, a demodulation circuit 30, an analog-to-digital (A/D) converter 40, a digital-to-analog (D/A) converter 50, a modulation circuit 60, and a controller 70.

The wireless communication terminal 1 is a wireless communication terminal capable of performing intermittent reception operation. At a time of transmitting a signal, the wireless communication terminal 1 causes the antenna switcher 20 to connect the antenna 10 to the modulation circuit 60, turns on a power supply of the modulation circuit 60, and transmits a signal. At a time of receiving a signal, the wireless communication terminal 1 causes the antenna switcher 20 to connect the antenna 10 to the demodulation circuit 30, turns on a power supply of the demodulation circuit 30, and receives a signal. Specifically, the wireless communication terminal 1 has a function as a receiving apparatus of a time division multiple access (TDMA) system for performing intermittent reception by a time slot reception period and a non-reception period in which reception of a predetermined number of consecutive time slots after the reception period is suspended. In this regard, the wireless communication terminal 1 performs power saving operation by turning off the power supply of the demodulation circuit 30 during the non-reception period of the intermittent reception operation.

The antenna 10 transmits a radio frequency (RF) to a base station. The antenna 10 receives an RF signal transmitted from the base station.

The antenna switcher 20 is controlled by the controller 70. The antenna switcher 20 connects the antenna 10 to the demodulation circuit 30 or the modulation circuit 60 under the control of the controller 70.

The demodulation circuit 30 generates an analog signal by demodulating the RF signal received by the antenna switcher 20. The demodulation circuit 30 outputs the generated analog signal to the A/D converter 40. Meanwhile, in the non-reception period of the intermittent reception operation performed by the wireless communication terminal 1, the controller 70 turns off the power supply of the demodulation circuit 30 and the demodulation circuit 30 performs power-saving operation. The demodulation circuit 30 does not demodulate the RF signal during the power-saving operation.

The A/D converter 40 converts the analog signal input from the demodulation circuit 30 to a digital signal. The A/D converter 40 outputs the converted digital signal to a reception filter 71 of the controller 70.

The D/A converter 50 converts a digital signal input from a transmission filter 79 of the controller 70 to an analog signal. The D/A converter 50 outputs the converted analog signal to the modulation circuit 60.

The modulation circuit 60 generates an RF signal by modulating the analog signal input from the D/A converter 50. The modulation circuit 60 outputs the generated analog signal to the antenna 10.

The controller 70 is implemented by, for example, causing a central processing unit (CPU), a micro processing unit (MPU), or the like to execute a program stored in a storage (not illustrated) by using a read only memory (RAM) or the like as a work area. In other words, the controller 70 implements each of the functions of the wireless communication terminal 1 of the present embodiment by executing a program that is recorded in a non-transitory computer-readable recording medium. The controller 70 may be implemented by, for example, an integrated circuit, such as an application specific integrated circuit (ASIC) or a field programmable gate array (FPGA). The controller 70 may be implemented by a combination of hardware and software.

The controller 70 includes the reception filter 71, a symbol detector 72, a forward error correction (FEC) decoder 73, a synchronous word detector 74, a symbol clock controller 75, a reception period controller 76, an FEC encoder 77, a symbol generator 78, and the transmission filter 79. The controller 70 has a function to control each of the units of the wireless communication terminal 1.

The reception filter 71 removes signal components in an unnecessary frequency band included in the digital signal input from the A/D converter 40. The reception filter 71 outputs the digital signal, from which the signal components in the unnecessary band is removed, to the symbol detector 72 and the synchronous word detector 74. The frequency band that is removed by the reception filter 71 can be set arbitrarily.

The symbol detector 72 determines a symbol value of the digital signal input from the reception filter 71 under the control of the symbol clock controller 75. Specifically, the symbol detector 72 determines the symbol value at a timing of a symbol clock input from the symbol clock controller 75. The symbol detector 72 outputs, to the FEC decoder 73, data related to the symbol value obtained as a result of the determination.

The FEC decoder 73 performs an FEC decoding process on the data that is related to the symbol value and that is input from the symbol detector 72.

The synchronous word detector 74 detects a synchronous word from the digital signal input from the reception filter 71. When a synchronous word is detected, the synchronous word detector 74 outputs, to the symbol clock controller 75, a timing signal related to a timing at which the synchronous word is detected.

The symbol clock controller 75 outputs a symbol clock to the symbol detector 72 when the wireless communication terminal 1 receives the RF signal. The symbol clock controller 75 outputs a symbol clock to the symbol generator 78 when the wireless communication terminal 1 transmits the RF signal. The symbol clock controller 75 includes a built-in symbol counter that performs counting for each of symbol clocks. The symbol clock controller 75 measures the number of symbols in a period from a time of a previous reset of counting of symbol clocks to a current time, and derives a symbol count value. If a timing signal is input from the synchronous word detector 74 when the wireless communication terminal 1 receives the RF signal, the symbol clock controller 75 resets an output timing of a symbol clock and the symbol counter with reference to the timing signal.

When resetting the output timing of the symbol clock and the symbol counter, the symbol clock controller 75 refers to the symbol count value at this time, and calculates a difference in the symbol clock between the wireless communication terminal 1 and the base station. The symbol clock controller 75 corrects a symbol clock frequency fc of the wireless communication terminal 1 based on the calculated difference in the symbol clock and the number of time slots after a time slot in which a latest synchronous word is detected. A method for correcting the symbol clock frequency fc will be described later. The symbol clock controller 75 outputs frequency corrected data related to a correction result of the symbol clock frequency to the reception period controller 76.

After the synchronous word detector 74 has detected the synchronous word, the reception period controller 76 corrects a reception termination timing in a time slot period in which the synchronous word is detected based on the frequency corrected data that is input from the symbol clock controller 75. A method for correcting the reception termination timing in the time slot period in which the synchronous word is detected will be described later. The reception period controller 76 outputs timing corrected data related to the corrected termination timing to the FEC decoder 73.

The FEC encoder 77 performs an FEC encoding process on transmission data that is to be transmitted to the base station. The FEC encoder 77 outputs the transmission data subjected to FEC encoding to the symbol generator 78.

The symbol generator 78 converts the transmission data that is subjected to the FEC encoding and input from the FEC encoder 77 to a symbol value. The symbol generator 78 outputs a signal related to the symbol value to the transmission filter 79 at a timing of the symbol clock that is input from the symbol clock controller 75.

The transmission filter 79 removes signal components in an unnecessary frequency band included in the signal that is related to the symbol value and that is input from the symbol generator 78. The transmission filter 79 outputs the signal, from which the signal components in the unnecessary band is removed, to the D/A converter 50. The frequency band that is removed by the transmission filter 79 can be set arbitrarily.

Process of correcting symbol clock frequency A process of correcting the symbol clock frequency fc according to the embodiment will be described with reference to FIG. 2. FIG. 2 is a timing diagram for explaining the method for correcting the symbol clock frequency fc.

In the timing diagram illustrated in FIG. 2, a transmission timing of the base station, a reception timing of the wireless communication terminal 1, an intermittent reception cycle of the wireless communication terminal 1, a symbol clock of the base station, and a symbol clock of the wireless communication terminal 1 are illustrated.

A period T1 indicates a non-reception interval in the intermittent reception operation of the wireless communication terminal 1 that is located in a range covered by the base station. In the period T1, the wireless communication terminal 1 turns off the power supply of the demodulation circuit 30 and performs power-saving operation. In the period T1, the symbol clock of the base station and the symbol clock of the wireless communication terminal 1 are not synchronized with each other.

A time point t1 indicates a timing at which the non-reception interval of the intermittent reception of the wireless communication terminal 1 is terminated and a reception interval is started. At a timing of the time point t1, the wireless communication terminal 1 turns on the power supply of the demodulation circuit 30 and enters a state in which demodulation of a reception signal is available. During a period from the time point t1 to a timing at which the reception interval is terminated, the symbol detector 72 outputs data on a single symbol for each of symbol clocks that are input from the symbol clock controller 75. When a predetermined number of symbols are input, the FEC decoder 73 performs the FEC decoding process on the input data.

A time point t2 indicates a timing at which the wireless communication terminal 1 receives a last symbol of a synchronous word. At the time point t2, a timing of a transmission slot 80 that is a time slot on the base station side coincides with a timing of a reception slot 90 that is a time slot on the wireless communication terminal 1 side. Therefore, at the time point t2, a timing at which the wireless communication terminal 1 receives a last symbol of a synchronous word 81 and a timing at which the base station transmits the last symbol of the synchronous word 81 coincide with each other. Here, the synchronous word detector 74 outputs a timing signal related to a timing of detection of the synchronous word to the symbol clock controller 75. The symbol clock controller 75 resets the output timing of the symbol clock of the wireless communication terminal 1 and the symbol counter based on the timing signal that is input from the synchronous word detector 74. In the present embodiment, a process of resetting the output timing of the symbol clock and the symbol counter may be referred to as symbol synchronization. At this moment, the symbol clock of the base station and the symbol clock of the wireless communication terminal 1 coincide with each other.

A time point t3 indicates a timing at which the reception interval of the intermittent reception of the wireless communication terminal 1 is terminated and the non-reception interval is started. At a timing of the time point t3, the wireless communication terminal 1 turns off the power supply of the demodulation circuit 30 and starts power-saving operation.

A time point t4 indicates a timing at which the non-reception interval of the intermittent reception of the wireless communication terminal 1 is terminated and the reception interval is started again. At a timing of the time point t4, the wireless communication terminal 1 turns on the power supply of the demodulation circuit 30 and enters a state in which demodulation of a reception signal is available. In other words, in the example illustrated in FIG. 2, a single cycle is formed of the four reception slots 90. During a period from the time point t4 to a timing at which the reception interval is terminated, the symbol detector 72 outputs data of a single symbol for each of symbol clocks that are input from the symbol clock controller 75. However, since the wireless communication terminal 1 starts the reception interval with reference to a symbol clock that is based on an oscillator inside the symbol clock controller 75, a timing of the reception slot and a timing of the transmission slot of the base station are deviated from each other. Therefore, the symbol detector 72 is not able to output a desired result.

A time point t5 indicates a timing at which the wireless communication terminal 1 receives the last symbol of the synchronous word. However, since the timing of the transmission slot 80 of the base station and the timing of the reception slot 90 of the wireless communication terminal 1 are deviated from each other, the timing at which the wireless communication terminal 1 receives the last symbol of the synchronous word 81 and a timing at which the base station transmits the last symbol of the synchronous word 81 are deviated from each other. Therefore, at the time point t5, the synchronous word detector 74 does not output the timing signal indicating the timing of detection of the synchronous word.

A time point t6 indicates a timing at which the base station transmits the last symbol of the synchronous word. At the timing of the time point t6, the synchronous word detector 74 detects the synchronous word and outputs the timing signal to the symbol clock controller 75. Then, similarly to the operation at the time point t2, the symbol clock controller 75 resets the output timing of the symbol clock of the wireless communication terminal 1 and the symbol counter.

At the time point t6, the symbol clock controller 75 corrects the symbol clock frequency of the wireless communication terminal 1. Specifically, the symbol clock controller 75 refers to the count value of the number of symbols at the time point t6, calculates a difference in the number of symbol clocks between the base station and the wireless communication terminal 1, and corrects the symbol clock frequency of the wireless communication terminal 1 based on a result of the calculated difference and the number of time slots that are present after the time slot in which the latest synchronous word is detected. For example, in a communication format illustrated in FIG. 2, the number of symbols in a single time slot is set to 10. As in the example illustrated in FIG. 2, the symbol counter of the symbol clock controller 75 normally indicates 40 at a moment at which the synchronous word is detected in a four-slot cycle.

Here, it is assumed that the symbol detector 72 detects 41 as the number of symbols for four slots. This means that the symbol clock in a single cycle of the wireless communication terminal 1 is earlier than the symbol clock of the base station by a single symbol, that is, the symbol clock frequency fc is increased. The symbol clock controller 75 corrects the symbol clock frequency based on a value of the difference. In this case, the symbol clock controller 75 sets the symbol clock frequency such that the number of symbol clocks in a single cycle is delayed by a single symbol. In other words, the symbol clock frequency fc is set such that (a symbol clock frequency before correction×(the number of symbol clocks in a single cycle−a difference in the number of symbol clocks)/the number of symbol clocks in a single cycle). Accordingly, it is possible to synchronize the symbol clock frequency fc of the wireless communication terminal 1 with the symbol clock frequency of the base station. Meanwhile, in the example illustrated in FIG. 2, for simplicity of explanation, it is assumed that the number of symbols included in a single time slot is set to 10, but this is a mere example, and the present application is not limited to this example. The number of symbols included in a single time slot may be set arbitrarily.

A time point t7 indicates a timing at which the reception interval of the intermittent reception of the wireless communication terminal 1 is terminated and a non-reception interval is started. At a timing of the time point t7, the wireless communication terminal 1 turns off the power supply of the demodulation circuit 30 and starts power-saving operation. Further, the number of symbol clocks during a period from a timing at which the synchronous word ends to a timing at which the reception slot ends is already known. At a timing of the time point t7, the symbol clock frequency fc of the wireless communication terminal 1 is synchronized with the symbol clock frequency of the base station. This is because, after detection of the synchronous word, the reception period controller 76 corrects a reception termination timing of the reception slot 90 that has detected the synchronous word, based on the symbol clock that is corrected by the symbol clock controller 75. Therefore, the timing at which the wireless communication terminal 1 receives the last symbol of the synchronous word 81 and the timing at which the base station transmits the last symbol of the synchronous word 81 coincide with each other. Accordingly, after the time point t7, the symbol clock frequency of the base station and the symbol clock frequency of the wireless communication terminal 1 are synchronized with each other. In other words, the reception period controller 76 corrects a reception start timing and a reception termination timing after the reception slot 90 in which the synchronous word is detected.

A time point t8 indicates a timing at which the non-reception interval of the intermittent reception of the wireless communication terminal 1 is terminated and the reception interval is started again. At a timing of the time point t8, the wireless communication terminal 1 turns on the power supply of the demodulation circuit 30 and enters a state in which demodulation of the reception signal is available. At a timing of the time point t8, the symbol clock frequency of the wireless communication terminal 1 is synchronized with the symbol clock frequency of the base station. Therefore, a timing at which the wireless communication terminal 1 receives a top symbol of the synchronous word 81 and a timing at which the transmission station transmits a top symbol of the synchronous word 81 coincide with each other. In other words, a timing at which the non-reception interval is changed to the reception interval of the intermittent reception of the wireless communication terminal 1 coincides with a timing at which the base station transmits a top symbol of the transmission slot.

Further, in the present embodiment, it is preferable that the symbol clock frequency of the wireless communication terminal 1 before correction is set to be higher than the symbol clock frequency of the base station. This is because, for example, as indicated at the timing of the time point t4, a top of the reception slot of the wireless communication terminal 1 is located ahead of a top of the corresponding transmission slot of the base station. Accordingly, the wireless communication terminal 1 is able to first receive the top symbol of the synchronous word 81, and therefore is able to correct the symbol clock frequency more appropriately.

As described above, in the present embodiment, the symbol clock frequency of the base station and the symbol clock frequency of the wireless communication terminal 1 are synchronized with each other. Accordingly, in the present embodiment, a timing of change from the non-reception interval to the reception interval in the intermittent transmission of the wireless communication terminal 1 and a timing of the top symbol of the transmission slot of the base station coincide with each other. Therefore, in the present embodiment, it is possible to set the reception period in the intermittent reception appropriately.

In the present embodiment, it is not necessary to turn on the power supply of the wireless communication terminal 1 at an earlier timing in order to synchronize the symbol clock frequency of the base station with the symbol clock frequency of the wireless communication terminal 1. Further, in the present embodiment, reception of the top symbol of the transmission slot that is transmitted from the base station is started at a moment at which the non-reception interval is changed to the reception interval. With this configuration, in the present embodiment, it is possible to increase a time in which the wireless communication terminal 1 operates in a power-saving mode, so that it is possible to reduce power consumption.

Modification

A modification of the present embodiment will be described below.

In the present embodiment, the symbol clock controller 75 corrects the symbol clock frequency based on a calculated difference between the number of set symbols and the number of measured symbols in a single reception interval between two points, but the present application is not limited to this example. The symbol clock controller 75 may set the symbol clock frequency by calculating (the symbol clock frequency before correction×the number of symbol counts/the number of symbol clocks in a single cycle). Further, when a difference in the number of symbols is extremely small after correction of the symbol clock or the like, it may be possible to correct the symbol clock frequency by extending a period till next correction by, for example, doubling the current four-slot reception interval in which the correction is performed to an eight-slot reception interval.

The wireless communication terminal 1 may correct the symbol clock frequency as described above every time the power supply is turned on, or may store a correction value in an internal memory of the wireless communication terminal 1 once correction is performed and may perform the correction using the correction value in a second or later correction. Specifically, when the power supply of the wireless communication terminal 1 is turned on after the correction is performed once, the symbol clock controller 75 may read the correction value stored in the memory and correct the symbol clock frequency. In other words, the wireless communication terminal 1 may start to receive a signal from the base station in a state in which the symbol clock frequency is corrected.

In the present embodiment, it is explained that a single base station is used, but the present embodiment is applicable to a wireless communication system that includes a plurality of base stations. For example, in a wireless communication system that includes a plurality of base stations, when symbol clock frequencies among the base stations are not synchronized, and when the wireless communication terminal 1 moves from a certain base station to another base station, the wireless communication terminal 1 may correct the symbol clock frequency again by the method according to the present embodiment. Further, once correction is performed, it may be possible to store a correction value in the internal memory of the wireless communication terminal 1, and perform the correction by using the correction value in a second or later correction. Furthermore, when the power supply of the wireless communication terminal 1 is turned on after the correction is performed once, the symbol clock controller 75 may read the correction value that is stored for each of the base stations in the memory, and correct the symbol clock frequency.

According to the present application, it is possible to set an appropriate reception period in intermittent reception.

Although the invention has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A reception apparatus of a time division multiple access (TDMA) system for performing intermittent reception by a reception period of a time slot and a non-reception period of a predetermined number of time slots which follow the reception period and in which reception is suspended, the reception apparatus comprising:
   a memory that is configured to store computer executable instructions; and
   a processor that is configured to execute the computer executable instructions to perform operations, comprising:
   detecting a synchronous word from a digital signal input from a reception filter and outputting a timing signal related to a timing at which the synchronous word is detected;
   oscillating a symbol clock;
   correcting a symbol clock frequency by a number of time slots from a time slot in which a timing at which the synchronous word has been previously detected to a time slot in which a timing at which the synchronous word is currently detected, a symbol count value calculated by counting the symbol clock during a period from the timing at which the synchronous word has been previously detected to the timing at which the synchronous word is currently detected, and a symbol count value on a base station side; and correcting a reception termination timing of the reception period of the time slot in which the synchronous word is currently detected based on the symbol clock with the corrected symbol clock frequency.

2. The reception apparatus according to claim 1, wherein the symbol clock controller is further configured to correct the symbol clock frequency based on the symbol count value and a number of original symbols in the time slots during the previous reception period and the non-reception period which follow the previous reception period.

3. The reception apparatus according to claim 2, wherein the reception period controller is further configured to correct, based on the corrected symbol clock, the reception termination timing of the reception period of the time slot in which the synchronous word is detected, and correct a reception start timing of a next reception period of the time slot which follows the reception period of the time slot in which the synchronous word is detected.

4. The reception apparatus according to claim 3, wherein the symbol clock frequency of the symbol clock of the reception apparatus before the correction is equal to or larger than a symbol clock frequency of a symbol clock of a reception target signal.

5. A correction method implemented by a reception apparatus of a time division multiple access (TDMA) system for performing intermittent reception by a reception period of a time slot and a non-reception period of a predetermined number of time slots which follow the reception period and in which reception is suspended, the correction method comprising:
   detecting a synchronous word from a digital signal input from a reception filter and outputting a timing signal related to a timing at which the synchronous word is detected;
   oscillating a symbol clock;
   correcting a symbol clock frequency by a number of time slots from a time slot in which a timing at which the synchronous word has been previously detected to a time slot in which a timing at which the synchronous word is currently detected, a symbol count value calculated by counting the symbol clock during a period from the timing at which the synchronous word has been previously detected to the timing at which the synchronous word is currently detected, and a symbol count value on a base station side; and
   correcting a reception termination timing of the reception period of the time slot in which the synchronous word is currently detected based on the symbol clock with the corrected symbol clock frequency.

6. A non-transitory computer-readable storage medium that stores a program that causes a computer to execute a correction method implemented by a reception apparatus of a time division multiple access (TDMA) system for performing intermittent reception by a reception period of a time slot and a non-reception period of a predetermined number of time slots which follow the reception period and in which reception is suspended, the correction method comprising:
   oscillating a symbol clock;
   correcting a symbol clock frequency by a number of time slots from a time slot in which a timing at which the synchronous word has been previously detected to a time slot in which a timing at which the synchronous word is currently detected, a symbol count value calculated by counting the symbol clock during a period from the timing at which the synchronous word has been previously detected to the timing at which the synchronous word is currently detected, and a symbol count value on a base station side; and correcting a reception termination timing of the reception period of the time slot in which the synchronous word is currently detected based on the symbol clock with the corrected symbol clock frequency.

\* \* \* \* \*